United States Patent [19]

Stier

[11] 4,018,107
[45] Apr. 19, 1977

[54] SAW SHARPENING MACHINE

[75] Inventor: Otto Stier, Biberach an der Riss, Germany

[73] Assignee: Vollmer Werke Maschinenfabrik GmbH, Germany

[22] Filed: Aug. 4, 1975

[21] Appl. No.: 601,912

Related U.S. Application Data

[63] Continuation-in-part of Ser. No. 464,317, April 26, 1974, abandoned.

[30] Foreign Application Priority Data

Apr. 26, 1973 Germany ........................ 2321160
Feb. 13, 1975 Germany ........................ 2505985

[52] U.S. Cl. .................................................. 76/41
[51] Int. Cl.² ........................................ B23D 63/14
[58] Field of Search ........................... 76/37, 40–43

[56] References Cited

UNITED STATES PATENTS 2,619,851   12/1952   Moohl ................................... 76/41
3,427,903   2/1969    Bodington ............................. 76/41

FOREIGN PATENTS OR APPLICATIONS 1,043,026   11/1958   Germany .............................. 76/41

Primary Examiner—Al Lawrence Smith
Assistant Examiner—Nicholas P. Godici
Attorney, Agent, or Firm—Hill, Gross, Simpson, Van Santen, Steadman, Chiara & Simpson

[57] ABSTRACT

A machine for sharpening saws having alternating pre-cutting teeth and post-cutting teeth of lesser height which reciprocates a grinding wheel to grind first the leading edge of a pre-cutting tooth to a fixed depth, the grinding wheel is then raised to grind the back edge of an adjacent post-cutting tooth and is next lowered to the same depth for grinding the leading edge of the post-cutting tooth and the grinding wheel is finally raised again thereby cutting a lesser amount of the back face of the adjacent pre-cutting tooth. The machine has a first cam actuating mechanism for imparting a fixed length stroke to the grinding wheel and a second cam mechanism coupled to the first mechanism for varying the stroke with adjustments being provided for both mechanisms.

11 Claims, 12 Drawing Figures

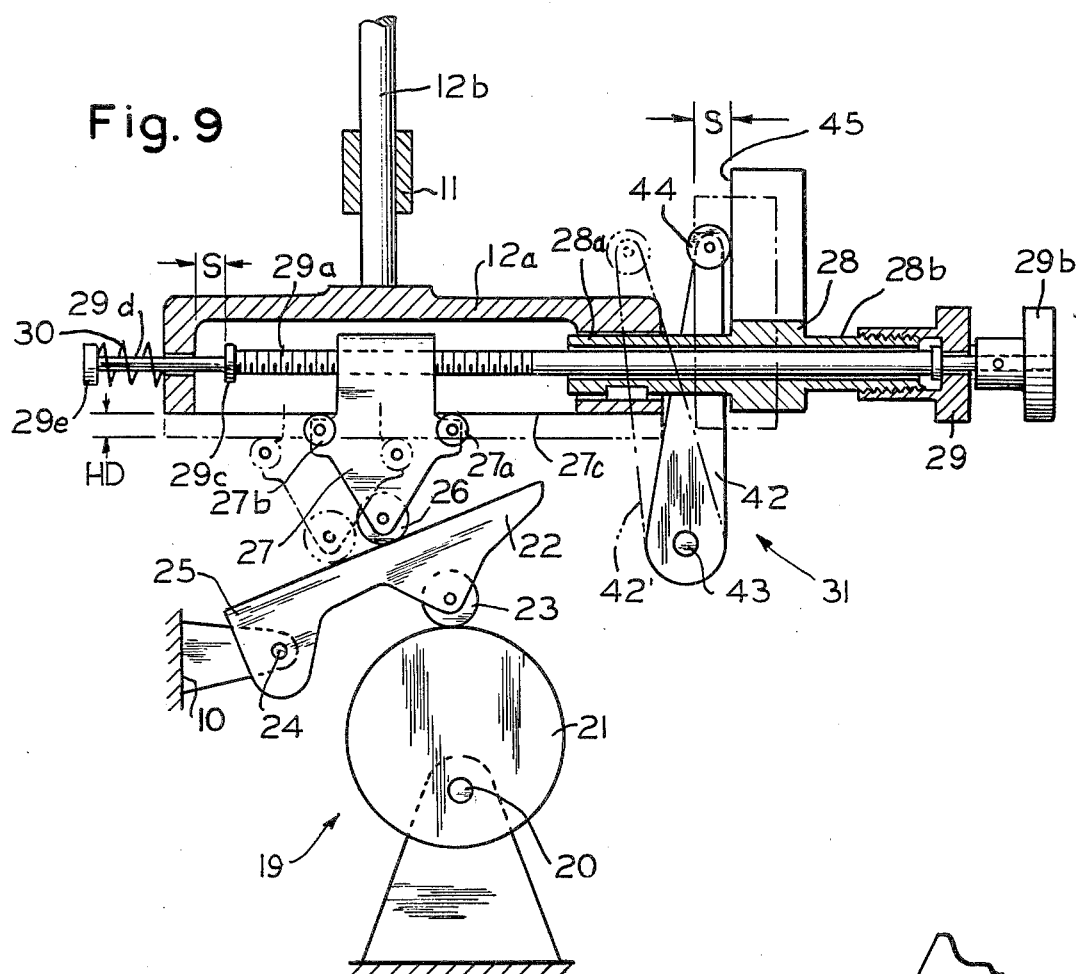
Fig. 9
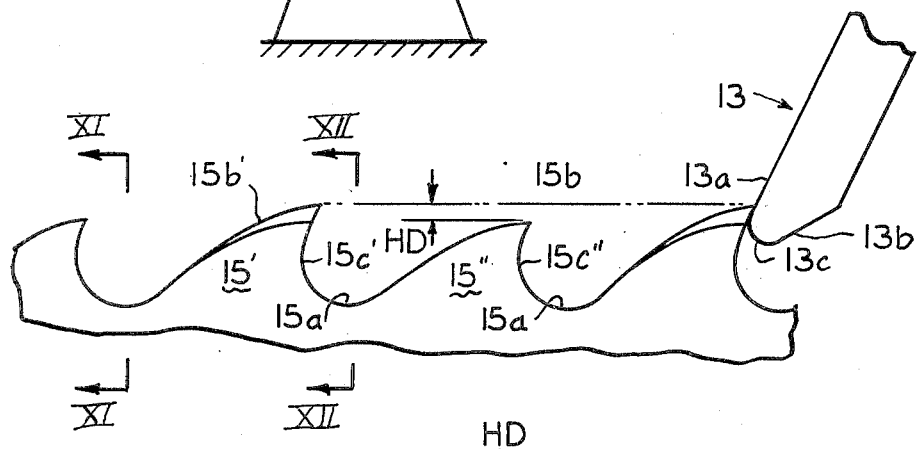
Fig. 10
Fig. 11    Fig. 12

SAW SHARPENING MACHINE

RELATED APPLICATION

This application is a continuation-in-part of my copending application entitled "Saw Sharpening Machine", Ser. No. 464,317, filed Apr. 26, 1974, now abandoned.

BACKGROUND OF THE INVENTION

1. Field of the Invention

This invention relates to the art of saw sharpening machines for the sharpening of saw teeth having alternate high profile pre-cutting teeth and low profile post-cutting teeth and particularly deals with machines for sharpening circular saws having a motor driven grinding disk with first mechanism effecting relative reciprocation between the saw and disk and second mechanism cyclically increasing and decreasing the reciprocating stroke to grind the cutting edge of a pre-cutting tooth and the back face of the adjacent post-cutting tooth and then sharpening the cutting edge of the post-cutting tooth and the back face of the next adjoining pre-cutting tooth with the back face cutting depths controlled to maintain the alternating high and low profiles of adjoining teeth.

2. Prior Art

Circular saw blades particularly useful for the sawing of metals commonly have alternating pre-cutting and post-cutting teeth differentiated in that the tips of the pre-cutting teeth have a higher profile than those of the post-cutting teeth and are appreciably beveled while the post-cutting teeth are either not beveled or only slightly beveled. During the sawing of a workpiece with such circular saws, the pre-cutting teeth operate to form a deep cut while the post-cutting teeth widen the width of the cut.

For sharpening saw blades with pre-cutting and post-cutting teeth, it is necessary to adapt the relative lifting movement after a feed of a saw blade by one tooth division between the sharpening tool and the saw blade to the different heights of the tooth tips of the pre-cutting teeth and the post-cutting teeth. It is usual for this purpose to superimpose on the lifting movement an additional movement so that upon sharpening of a pre-cutting tooth, both the lower as well as the upper dead center of the lifting movement is higher than upon sharpening of a post-cutting tooth. This produces an excessive cutting away of metal from the saw blade because each second tooth is cut uniformly over its entire length from its base to its tip and if, for example, the pre-cutting teeth are regarded as the normal teeth, then the post-cutting teeth are undercut by the amount of the lifting displacement. The loss of metal from the saw is particularly great if the machine is mistakenly adjusted so that the pre-cutting teeth are ground as post-cutting teeth and vice versa.

Finally, such prior known saw sharpening machines produce appreciable mass inertia forces which damage the machine and prevent a smooth operation.

SUMMARY OF THIS INVENTION

The term "lifting movement" as used herein, includes not only the up and down vertical movement of the sharpening tool as illustrated, but also includes reciprocating movement in any direction whether it is carried out by the sharpening tool or by the saw blade to be sharpened.

The term "sharpening" as used herein, includes sharpening by any type of tool, preferably a grinding disk and the first time sharpening in the production of a saw blade or a resharpening of a worn, used saw blade.

The machines of this invention reduce the cutting or chipping force required for the sharpening of saw blade teeth of different heights and minimize metal removal to thereby greatly increase output capacity.

According to this invention, the additional lifting movement for the grinding disk is derived from an additional drive through a gearing having a 1:2 ratio in such manner that upon grinding of each tooth root or base, it assumes a zero position and upon grinding of consecutive tooth tips it assumes first a positive and then a negative position, resulting in a sinusoidal type of pathtime-course. In this manner, the tooth base of all of the pre-cutting teeth and all of the post-cutting teeth lie at the same level on a common base circle and the normal lifting movement is not shifted with each second tooth by a fixed additional lift but is altered by a constant additional lifting movement aligned similarly with each second tooth of the normal lifting movement and directly oppositely to the normal lifting movement with the teeth lying therebetween. Therefore, the amplitude of the additional lifting movement in each case is effected up to the half point upon grinding of a pre-cutting tooth and upon the grinding of the post-cutting tooth lying therebetween. Because of this distribution of the additional lifting movement to all of the teeth, accelerations occurring with given lift frequencies and also the oscillation exciting mass inertia forces are much less than heretofore encountered.

In a preferred embodiment of this invention, the grinding tool or the saw blade is mounted on a reciprocating lift mechanism actuated by a cam and having an adjusting device with a slide member varying the stroke and with the slide member further controlled by an additional drive actuated by a cam or the like having an adjustable stroke.

In another embodiment of the invention, the additional drive has an eccentric which is adjustable in a radial guide way on a shaft rotation 180° during each full stroke of the lift mechanism.

The invention, in its various features, will be better understood from the somewhat diagrammatic drawings of an embodiment of the invention.

IN THE DRAWINGS:

FIG. 9 is a fragmentary vertical section of the parts shown along the line IX—IX of FIG. 8;

FIG. 10 shows a portion of a circular saw with teeth to be sharpened by the machine of this invention;

FIG. 11 is a fragmentary cross-sectional view taken along the line XI—XI of FIG. 10; and FIG. 12 is a fragmentary sectional view taken along the line XII—XII of FIG. 10.

Figure 1:
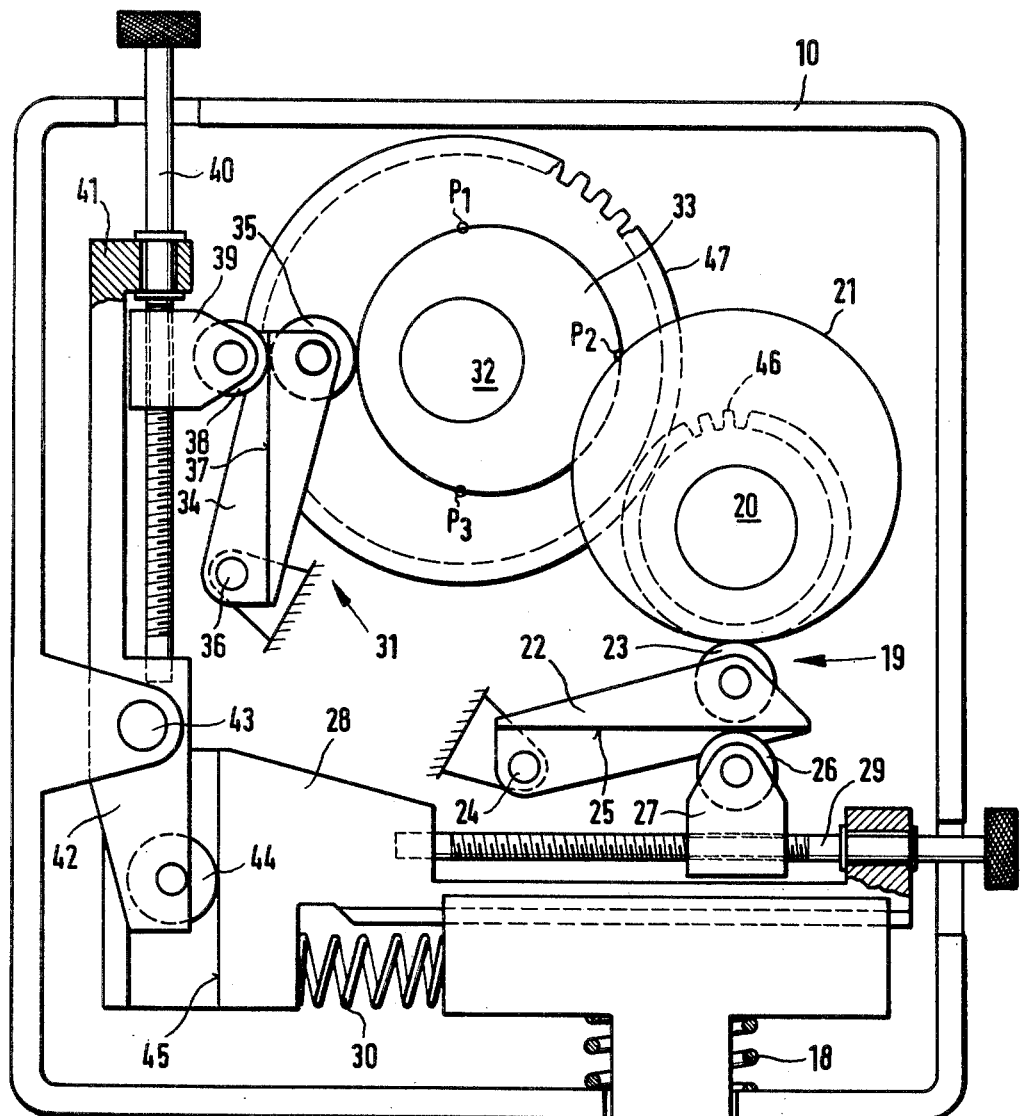
FIG. 1 is a diagrammatic elevational view of a saw sharpening machine according to this invention for the sharpening of a circular saw having pre-cutting and post-cutting teeth of different height.
Figure 4:
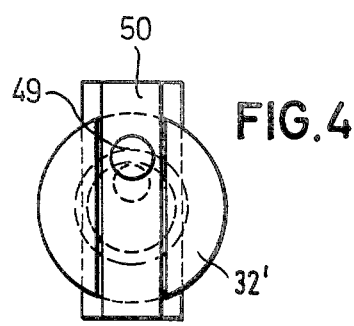
FIG. 4 is a plan view of FIG. 2.

AS SHOWN ON THE DRAWINGS:

The machine of FIG. 1 includes a housing 10 with its cover removed. The housing is fixed on the base of a saw sharpening machine or may form the base. A guide way 11 depends from the bottom wall of the housing mounting a push rod 12 for vertical reciprocating movement. A grinding disk 13 driven by a motor 14 is mounted on the bottom end of the push rod 12. A circular saw 15 to be sharpened is mounted below the grinding disk 13 and has alternating pre-cutting teeth 15' and post cutting teeth 15" successively brought into grinding position by a feed pawl 16 operating in the direction of the arrow 17 so that each tooth face successively lies in the plane of the grinding disk.

The push rod 12 is supported on a spring 18 lifting the head of the rod above the bottom of the housing. A drive mechanism designated generally by the reference numeral 19 presses the rod 12 downwardly against the force of this spring 18. The drive mechanism 19 includes a circular cam disk 21 eccentrically positioned on a shaft 20. A rocker arm 22 carries a cam follower roller 23 riding on the circumferential surface of the cam disk 21. The rocker arm 22 is pivoted at one end of a stationary bearing pin 24 and has a plane contact surface 25 extending in spaced relation from the geometrical axis of the bearing pin 24. A roller 26 carried by a movement receiver or carriage 27 rides on this contact surface 25.

The carriage 27 is adjustably carried on a slide member 28 along a horizontal path at right angles to the vertical direction of the lifting movement of the push rod 12. This carriage 27 receives the threaded spindle of an adjusting device 29 rotatably mounted on the slide 28 and held against axial shifting on the slide. The radius of the roller 26 is the same as the distance between the geometrical axis of the bearing pin 24 and contact surface 25 of the rocker arm 22.

If the carriage 27 is shifted so that the axis of the roll 26 corresponds with the axis of the bearing pin, rotation of the cam disk 21 will effect no movement of the push rod. However, if the carriage 27 is spaced laterally from the bearing pin 24, then a half revolution of the cam disk 21 from the position shown in FIG. 1, pushes the rod 12 downwardly and the extent of the downward stroke increases with increased spacing of the carriage 27 from the bearing pin 24. In a position illustrated in FIG. 1 where the carriage 27 positions the axis of the roll 26 in a common plane with the axis of the cam follower roll 23 and the axis of the shaft 20, the downward stroke of the push rod effected in a half of a revolution of the cam disk 21 is the eccentric throw of the cam.

It should be understood that rocker arm 22, in operation, never quite assumes a position in which its contact surface 25 is parallel to the direction of movement of the slide member 28.

The slide member 28 is adjustably guided on the push rod 12 parallel to the longitudinal direction of the adjusting device 29 and at a right angle to the direction of the lifting movements of the push rod 12 and is urged to the left by means of a spring 30.

An additional lifting drive 31 with parts corresponding generally to those of the lifting device 19 is provided for shifting the slide 28 against the pressure of the spring 30. The drive 31 includes a shaft 32 having a circular cam disk 33 eccentrically fixed thereon. A rocker arm 34 carrying a cam follower roll 34 riding on the cam disk 33 is pivoted on a stationary bearing pin 36 and has a contact surface 37 for a roll 38 of a movement receiver or carriage 39. This carriage 39 is adjusted by an adjusting device 40 which, as illustrated, has a threaded spindle rotatable in one arm 41 of a two armedlever 41, 42. This lever 41, 42 is pivotally mounted on a stationary bearing pin 43 in the vertical plane containing the push rod 12 and slide member 28.

A roll 44 is rotatably mounted on the second arm 42 of the two armed lever 41, 42. The roll 44 rides on a guide 45 of the slide 28 and the spring 30 presses the guide 45 against the roll 44 thereby swinging the two armed lever 44, 42 so that the roll 38 carried by the carriage 39 presses against the contact surface 37 of the rocker arm 34 and thereby urges the roll 35 against the cam disk 33.

A gear 46 is mounted on the shaft 20 in meshed engagement with a gear 47 mounted on the shaft 32 and having twice the number of teeth as the gear 46. Thus, the lifting mechanism 19 and the additional lifting mechanism 31 are coupled by the gear wheels 46 and 47 in such a manner that, in the starting position illustrated in FIG. 1, both cam follower rolls 23 and 35 contact the cicumferential surface of the respective cam disks 21 and 33 at points of least distance from the geometrical axis of the respective shafts 20 and 32. As illustrated, the contact surfaces 25 and 37 of the rocker arms 22 and 34 will then extend generally parallel to the directions in which the carriages 27 or 39 can be adjusted by their respective adjusting devices 29 or 40. In this illustrated position, therefore, the push rod 12 is at the top end of its stroke.

If the cam disk 21 rotates in a clockwise direction 180° from the position of FIG. 1, the push rod 12 is pressed downwardly through the intermediary of the rocker arm 22 and the carriage 27 and at the same time, the cam disk 33 will be rotated a one-quarter revolution in a counterclockwise direction so that the point P1 contacts the cam follower roll 35 pressing the same to the left and swinging the rocker arm 34 in a counterclockwise direction whereupon the double armed lever 41, 42 will be pivoted about its bearing pin 43 to swing the roll 44 against the guide 45 thereby shifting the slide member 28 to the right against the pressure of the spring 30. This shifts the carriage 27 to the right and this movement will push the rod 12 downwardly because the contact surface 25 of the rocker arm is then inclined downwardly to the right. Accordingly the bottom of the stroke of the push rod 12 is caused by a superimposition of lifting components introduced on the one end by the cam disk 21 and on the other hand, by the cam disk 33. During this downward stroke of the push rod 12, the circular saw 15 is stationary so that the grinding disk 13 will grind a tooth face approximately radially from the tip of the tooth to the base of the tooth.

Then if the cam disk 21 makes a further half revolution in the clockwise direction, the rocker arm 22 will return to its starting position permitting the push rod 12 to move upwardly under the load of the spring 18 and during this second half revolution of the cam disk 21, the cam disk 33 will be moved a further quarter revolution in a counterclockwise direction to move the point $P_2$ into contact with the cam follower roll 35. During this quarter revolution the rocker arm 34 is pushed from its position determined by the point $P_1$, which may be designated as a middle or normal position, into its outermost lift position which may be designated as the positive maximum position since the travel of the rocker arm 34 from its middle position attains a maximum swing and the space of the axis of the cam follower 35 from the geometrical axis of the shaft 32 is at its greatest. In this described second quarter revolution of the cam disk 35, the slide member 28 and its carriage 27 is pushed further to the right with reference to the push rod 12 and rocker arm 22 and this shifting results in a retarding of the upward movement of the push rod 12 permitted by the cam disk 21 as long as the contact surface 25 of the rocker arm 22 still has an inclination directed downwardly to the right. During this second quarter revolution of the cam disk 33, the cam disk 33, the circular saw is pushed by the feed pawl 16 in the direction of the arrow 17 in such a manner that the sharpening edge of the grinding disk 13 travels along the tooth back of a post cutting tooth 15″ to its tooth tip.

Thus, because the upward movement of the push rod 12 is retarded or delayed by means of the lifting drive 31, a substantial amount of material will be ground off of the back of the saw tooth immediately in front of the cutting edge of the previously ground tooth.

During the next half revolution of the cam disk 21 and the downward stroke of the push rod 12 caused thereby, the circular saw 15 again remains stationary so that the grinding disk 13 dips downwardly along the tooth face of the post cutting tooth 15″, the back of which has just been sharpened in the previous step. This downward stroke is influenced also by the cam disk 33 which during the third half revolution of the cam disk 21 carries out a third quarter revolution swinging the rocker arm 34 and the double armed lever 41, 42 back to a middle position whereby the slide member 28 moves to the left and retards the downward movement of the push rod 12, otherwise permitted by the cam disk 21. At the end of the third quarter revolution of the cam disk 33 this disk contacts the cam follower roll 35 to the point $P_3$. The distance of the point $P_3$ from the geometrical axis of the shaft 32 is the same as the distance of the point $P_1$ from this axis. Accordingly at the end of the third quarter revolution of the cam disk 33, the influence of the lifting drive 31 on the position of the push rod 12 is the same as at the end of the first quarter revolution. Thus, the bottom of the stroke of the push rod 12 is the same each time and the grinding disk 13 moves to the same depth into each tooth base.

Finally, when the cam disk 21 carries out a fourth half revolution and the cam disk 33 carries out a fourth quarter revolution, the push rod 12 again moves upwardly while the rocker arm 34 and with it the double armed lever 41, 42 pivot to the right from its neutral position determined by the point $P_3$ into a maximum position. This position is designated as the negative maximum postion because the distance of the axis of the cam follower 35 from the geometrical axis of the shaft 32 is at the smallest amount. Further, the slide member 28 moves with the carriage 27 during the first quarter revolution of the cam disk 33 as far to the right as is possible with the given adjustment of the carriage 39. The carriage 27 is then moved to the left increasing the upward stroke of the push rod during the fourthhalf revolution of the cam disk 21. During this upward stroke the circular saw 15 is again moved by the feed pawl 16 in the direction of the arrow 17 to align the next tooth of a pre-cutting tooth 15′ with the grinding disk 13. Because of the accelerated upward lift of the push rod 12, the grinding disk 13 removes very little material from the back of the pre-cutting tooth 15′. In this manner, the back of this pre-cutting tooth remains higher than the back of the previously sharpened post cutting tooth 15″.

Thereafter, the operating cycle consisting of four half revolutions of the cam disk 21 and four quarter revolutions of the cam disk 33 taking place simultaneously is repeated for sharpening a further post cutting tooth 14″ and a further pre-cutting tooth 15′.

In FIGS. 2 to 5 a modified lifting drive 31′ is provided for the slide member 28 which as shown, has a guide way 45 engaging a slide ring 48 positioned on an eccentric pin 49. This pin 49 is a constituent of an eccentric 50 guided in a radial guide way 51 of a shaft 32′ which corresponds to the shaft 32 of FIG. 1 and is driven by a gear 47 in a ratio of 1:2 by the shaft 20.

Figure 5:
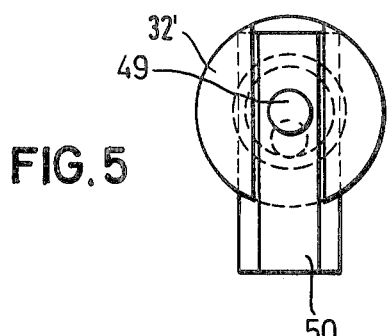
FIG. 5 is a view similar to FIG. 4 but showing another driving position.
Figure 2:
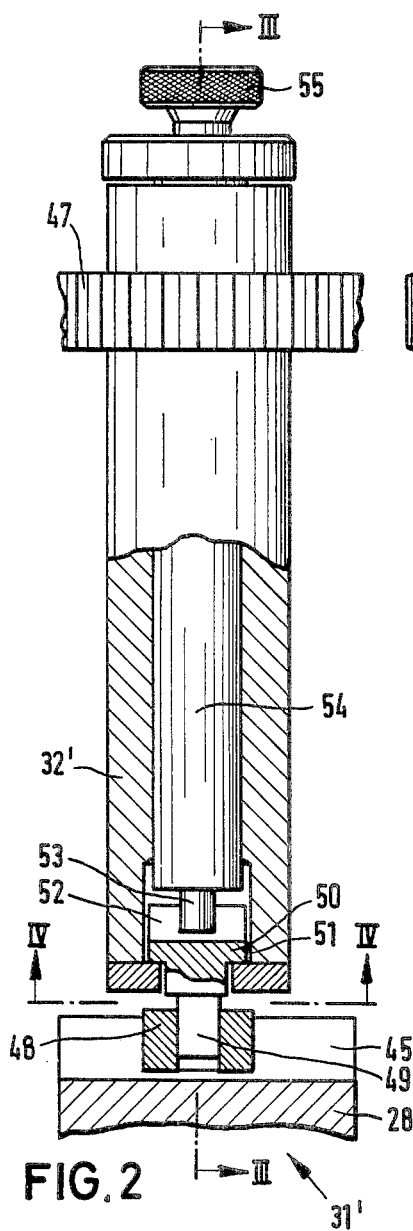
FIG. 2 is a fragmentary detail elevational view with parts in cross section of a modified embodiment.
Figure 3:
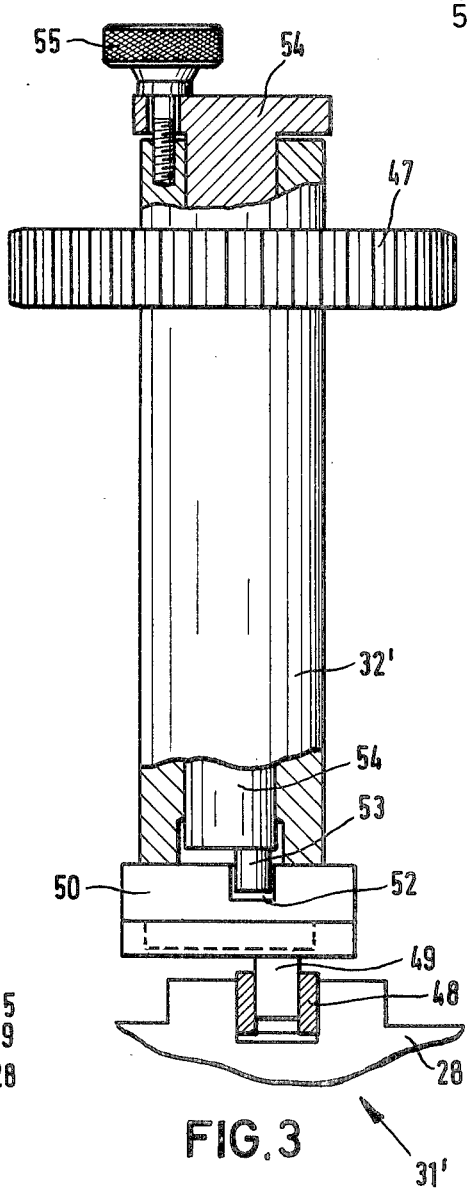
FIG. 3 is a view at right angles to FIG. 2 and with parts in section.

The eccentric 50 has a groove 52 extending transversely to the guide way 51 and an actuator 53 is engaged in this groove 52. The actuator 53 projects eccentrically from a setting bolt 54 rotatably positioned in an axial recess of the shaft 32′ and is adjustable with a knurled-head screw 55 in a predetermined degree of rotation. If the knurled-head screw 55 is loosened, the setting bolt 54 may be rotated and the eccentricity of the pin 49 is altered with reference to the geometric axis of the shaft 32′. As shwon in FIG. 4, the eccentricity is at a maximum and as shown in FIG. 5, the eccentricity is zero.

The lifting drive 32′ of FIGS. 2 to 5 cooperates with the lifting drive 19 of FIG. 1 in the same manner as the lifting drive 31.

Figure 6:
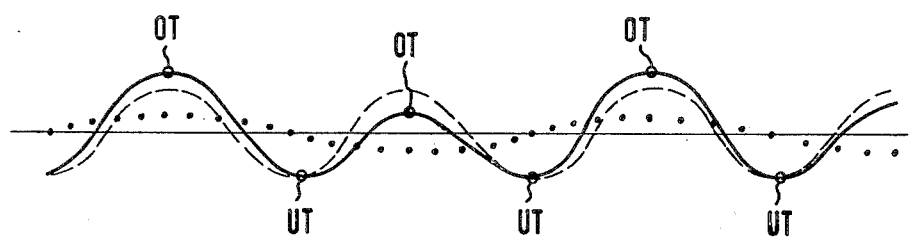
FIG. 6 is a diagram of the lifting and additional lifting movements introduced by the machine of the invention.
Figure 7:
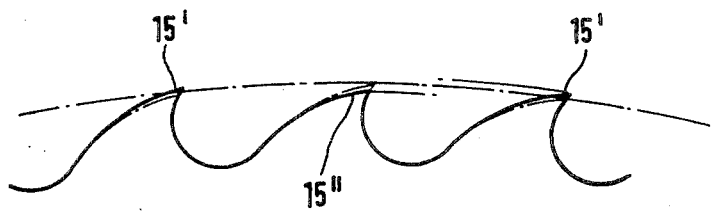
FIG. 7 is a fragmentary view of a circular saw with teeth sharpened by the machine of this invention.

FIG. 6 is a diagram applying time as the abscissa and stroke of the push rod 12 as the ordinate. The dashed line represents a lifting movement of the push rod 12 caused by the lifting drive 19. The component introduced by the additional lifting drive 31 or 31′ is illustrated by the dotted line. It will be understood that the illustrated lines are shown in idealized form as purely sinusoidal lines and that deviations from these lines involved in the operation of the machine of this invention are not appreciable. Since, as shown, the dashed line and the dotted line have different periods because of the transformation ratio between the shaft 20 and the shaft 32 or 32′, the resultant effect is an approximately sinusoidal line indicated by the continuous line showing the actual lifting movement of the push rod 12 and the grinding disk 13. The lower dead centers UT of the lifting movement are at the same level while the upper dead center OT alternate from the maximum to a minimum. It will, of course, be appreciated that the rocker arm 22 never quite assumes the position in which its contact surface 25 is parallel to the direction of movement of the slide member 28 so that the influence of the additional lifting drive 31 or 31′ is effective up to the upper dead center.

Figure 8:
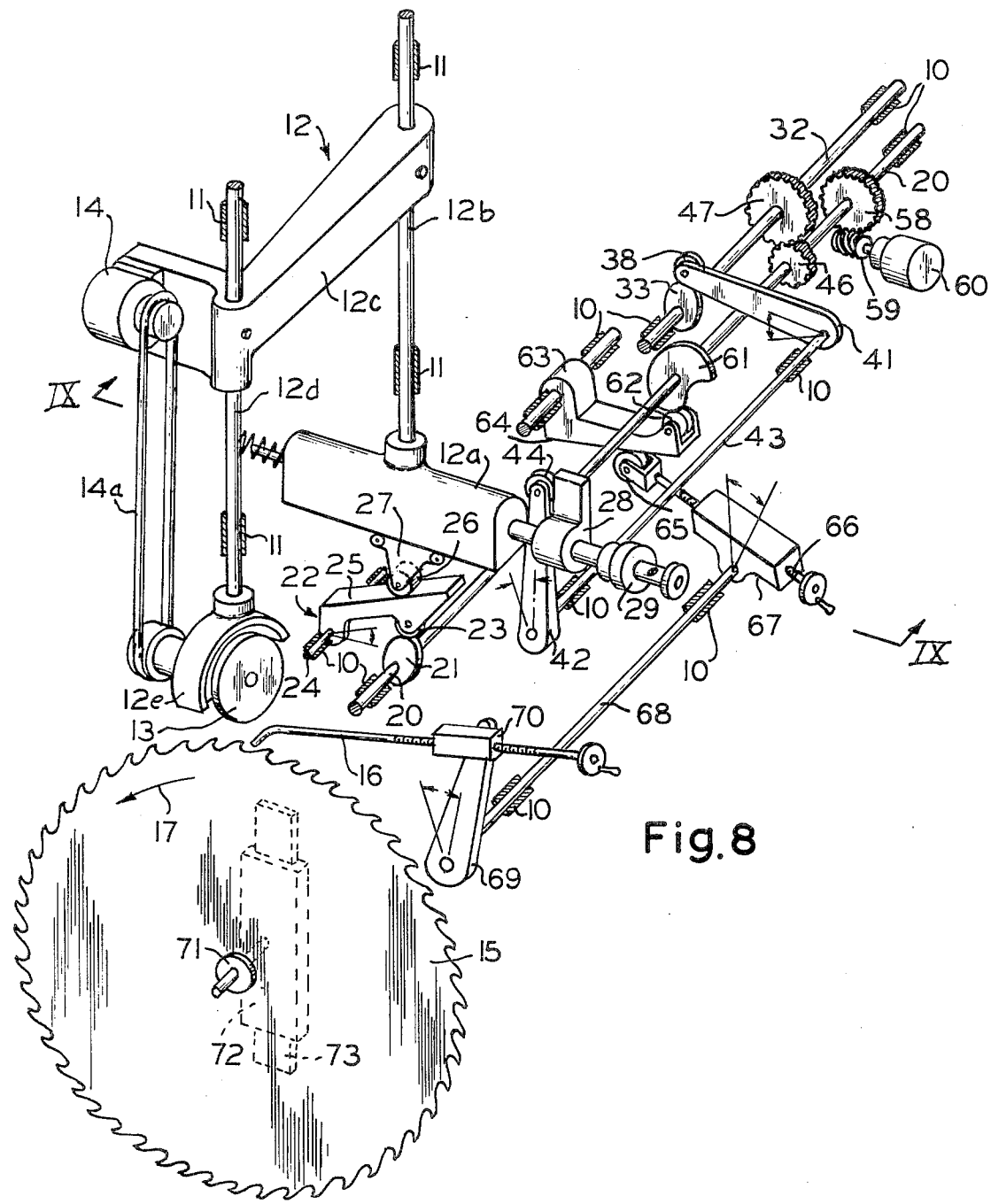
FIG. 8 is a perspective view of the major movable parts of another modified embodiment of the saw sharpening machine.

The saw sharpening machine illustrated in FIGS. 8 and 9 comprises a machine frame 10 illustrated only partly. At the machine frame 10 vertical guides 11 are formed in which a ram 12 is guided so as to be movable up and down. Ram 12 in the illustrated embodiment is a structural unit constituted mainly by a spindle housing 12a, a first guide rod 12b mounted thereto, a yoke 12c, a second guide rod 12d and a grinding wheel housing 12e mounted thereto. The two guide rods 12b and 12d are vertically arranged, guided in guides 11 and adjustably mounted at the yoke 12c. In the grinding wheel housing 12e a grinding disk is provided which in accordance with FIG. 10 has a substantially planar face end 13a, a frustro-conical shell 13b and a rounded grinding edge 13c between the said two surfaces. A motor 14 is fixed to the yoke 12c driving the grinding disk 13 via a drive belt 14a.

A circular saw is shown at 15 in FIG. 8 in postion to be sharpened by the illustrated saw sharpening machine. Instead of a circular saw, a belt saw or other saw could be sharpened by the illustrated machine. Irrespective of whether saw 15 is a circular saw or a belt saw or the like, it is to be sharpened such that the tooth-tip heights of successive teeth 15′ and 15″ differ by a difference in height HD. In accordance with FIGS. 10, 11 and 12, high pre-cutting teeth 15′ whose longitudinal edges are strongly chamfered are arranged in alternating arrangement with lower post-cutting teeth 15″ whose longitudinal edges are sharp.

Saw 15 can be advanced by steps by means of a feed pawl 16 in the direction of arrow 17, in FIG. 8. The entire structural unit designated as ram 12 due to gravity tends to occupy a lower-end position in which the grinding edge 13c of grinding disk 13 grinds tooth root 15a which always has the same low position between a pre-cutting tooth 15′ and a post-cutting tooth 15″, or between a post-cutting tooth 15″ and a pre-cutting tooth 15′. Starting from each tooth root 15a, the grinding edge 13c has to be guided along the tooth back 15b′ of a pre-cutting tooth 15′ in a lifting stroke during an advance movement caused by feed pawl 16. Subsequently in a downward stroke, the grinding disk has to grind tooth flank 15c′ of the same pre-cutting tooth 15′, and in the following lifting stroke, it has to grind tooth back 15b″ of the successive post cutting tooth 15″, wherein the grinding disk is moved less upwardly by tooth-height difference HD than in the preceding lifting stroke. Finally, the grinding disk reaches the next tooth root 15a upon a successive downward stroke along the tooth flank 15c″ of the same post-cutting tooth. The chamfered longitudinal edges of the pre-cutting teeth 15′ may be ground separately in a second and third operation of the saw 15 with inclined position of the grinding disk 13.

A lifting drive 19 is provided for the described lifting movement of raw 12, said lifting drive comprising a driven shaft 20 and a cam disk 21 mounted thereon. A cam follower roll 23 supported at a rocker arm 22 runs on the peripheral surface of the cam disk 21. Rocker arm 22 is supported in the machine frame 10 by bearing pin 24 at a distance from the cam follower roll 23 and has a relatively wide and planar track 25, on which a roll 26 of a follower element 27 runs.

Follower element 27, as shown, is a carriage having pairs of rollers 27a and 27b running on horizontal tracks 27c which extend in parallel with respect to the drawing plane of FIG. 9 at the underside of spindle housing 12a which is open at the bottom. Follower element 27 is connected to a slide 28 which itself is reciprocable with respect to spindle housing 12a in the same manner as the follower element itself, transversely to the longitudinal direction of guides 11.

Slide 28 has a cylindrical portion 28a illustrated at the left-hand side of FIG. 9 which is slidably guided in the spindle housing 12a but secured against rotation. For instance, a key and keyway connection may be provided as a means to secure slide 28 against rotation. Slide 28 also has a cylindrical portion 28b illustrated at the right-hand side in FIG. 9, which portion has an external thread and is in screw-threaded engagement with a sleeve-like intermediate member 29. Intermediate member 29 is rotatably supported on a screw spindle 29a but cannot be moved axially with respect to said spindle, the spindle extending through an axial bore of slide 28 and being screwed into a nut thread of follower element 27. A turning know 29b is fixed to one end of screw spindle 29a.

Intermediate member 29, together with the spindle 29a, thus provides for an adjustable connection between follower element 27 and slide 28, said connection being adjustable in a dual way. In a given position of side 28, screw spindle 29a can either be moved together with the follower element 27 in axial direction, upon turning the intermediate member 29; alternatively, by turning the turning know 29b, one can turn screw spindle 29a without changing its axial position, thus making follower element 27 travel along the screw spindle.

An abutment 29c is formed at screw spindle 29a, inside spindle housing 12a, which abutment limits the adjustability of the screw spindle in FIG. 9 to the left in that it abuts from inside against the left wall of spindle housing 12a. Through this wall, an extension 29d of screw spindle 29a extends. Extension 29d has a head 29e on its end. Between head 29e and spindle housing 12a, a pressure spring 30 is biassed. Thus, screw spindle 29a and slide 28 connected thereto, via the intermediate member 29, are continuously urged to the left.

An additional lifting drive 31 provides for a displacement of slide 28, overcoming the pressure of spring 30. The individual elements of said additional lifting drive 31 largely correspond to those of lifting drive 19. Said additional lifting drive 31 comprises a shaft 32 which is illustrated in FIG. 8 as being supported in the machine frame 10 and having cam disk 33 fixed thereon. A cam follower roll 38 running on cam disk 33 is supported on an arm 41. A shaft 43 supported in the machine frame 10 fixedly connects arm 41 with an arm 42 having a roll 44 supported thereon. A track 45 formed on slide 28 tends to abut said roll 44 under the action of spring 30.

Arm 42 and roll 44 form a drive element performing a reciprocating movement upon each complete rotation of cam disk 33, between left dead-center position indicated with dash-dotted lines in FIG. 9, and right-dead center position illustrated with solid lines, thus driving slide 28 away from spindle housing 12a and allowing the slide to return to a position indicated in FIG. 9 by dash-dotted lines. In FIG. 9, "s" designates the path along which slide 28, under the action of spring 30, can follow the movement of driver element 42, 44 upon the movement thereof from the right to the left dead-center position. Said path "s" equals the distance by which abutment 29c is remote from the left wall of spindle housing 12a in the right-hand dead-center position of spindle 29a. The distance "s" can thus be increased or decreased by turning intermediate member 29.

In order to bring about the desired difference in height HD between the pre-cutting teeth 15′ and the post-cutting teeth 15″ when sharpening a saw 15 for the first time and to retain said difference when the saw is resharpened, the additional lifting drive 31 must be effective only upon each second working cycle of lifting drive 19. This is achieved in that one of the two shafts 20 and 32 is driven, and that these two shafts are connected to each other by a transmission having a reduction ratio of 1 to 2. In the illustrated example, a gear 46 mounted to shaft 20 meshes with a gear 47 mounted to shaft 32 and has twice the number of teeth.

A worm gear 58 is mounted on shaft 20 which meshes with a worm 59 on the shaft of motor 60. The intermittently effected advance movement of the saw 15 being in synchronism with the lifting movement of ram 12 is deduced in the following manner:

A cam disk 61 is mounted to shaft 20; a cam follower roll 62 running on said cam disk is supported at a rocking arm 63. Rocking arm 63 in turn is swingably supported in machine frame 10 and has a track 64 for a roll 65. Roll 65 is mounted on a screw spindle 66 screwed into a rocker 67. Rocker 67 is fixedly connected to a lever 69 via a shaft 68, a block 70 being pivotally mounted to said lever. Advance pawl 16 is mounted to block 70 so as to be adjustable in length.

FIG. 8 illustrates a stub axle 71 on which saw 15 is pivotally mounted and secured against a displacement in axial direction, the saw being a circular saw in this case. Stub axle 71 is secured to a carriage 72 adjustable in longitudinal direction of a guide 73 parallel with respect to the direction of lifting of the ram 12 to ensure an adaptation to circular saws having different diameters.

The illustrated saw sharpening machine can be modified in various ways. It is for instance possible to design cam disk 21 substantially larger in relation to the parts cooperating with it than it is illustrated in FIG. 9; in this case rocking arm 22 need not be provided and hence roll 26 of follower element 27 runs directly on the peripheral surface of cam disk 21. The additional lifting of ram 12 caused by the transverse movements of slide 28 is in this case, however, no longer proportionate to the transverse movements. Also, cam disk 33 could act directly upon the track 45 at slide 28; shaft 43 with arms 41 and 42 being omitted in the latter case.

From the above descriptions it will, therefore, be understood that this invention superimposes an additional lifting movement on the stroke between a circular saw to be sharpened and a sharpening tool which has a constant base level and a zero position on which is consecutively imposed a positive and then a negative lifting action. The additional lifting movement has a sinusoidal time travel path about a zero position.

I claim:

1. A saw sharpening machine having a grinding tool and a saw blade mounting with a push rod reciprocating in a lifting direction to vary the spatial relation of the grinding tool and saw blade, a cam and follower drive for the push rod including a rocker arm carrying the follower and an adjustable carriage actuated by the rocker arm developing the reciprocation of the push rod, a slide member forming a part of said push rod and adjustably slidable on the push rod transversely of the direction of reciprocation, and an additional lifting drive shifting said slide to impart first a positive and then a negative lifting action to the push rod.

2. A saw sharpening machine for sharpening teeth of different tooth-tip height comprising a ram carrying a grinding tool or a saw blade and being guided to reciprocate in the direction of the tooth height, a slide movable transversely to the direction of movement of said ram, a first lifting drive acting upon said ram in the direction of movement of said ram through said slide to impart a reciprocating movement to said ram, a transmission device having a ratio of 1 to 2, an additional lifting drive connected to said first lifting drive by said transmission device, said additional lifting drive imparting to said slide reciprocating movements of adjustable length transversely to the direction of movement of said ram, a follower element reciprocable with said slide transversely of the direction of movement of said ram, means adjusting said follower element with respect to said side transversely of the direction of movement of said ram, said first lifting drive having a track receiving said follower element and defining an angle with the direction of the reciprocal movement of said slide which changes periodically in response to said reciprocal movement of said slide.

3. The saw sharpening machine as claimed in claim 2 including an additional track on said slide transversely to the direction of adjustment of said follower element, a lever pressed against said track and a second follower element supported on said lever, the second lifting drive acting upon said second follower element to impart a reciprocating movement to said lever.

4. The saw sharpening machine of claim 3 wherein second lifting drive comprises a rocker arm with a second track thereon, the second follower element riding on said second track.

5. The saw sharpening machine of claim 3 wherein the second follower element is adjustable in a longitudinal direction of the lever supporting said second follower element.

6. The saw sharpening machine as claimed in claim 2 including a further track on the slide extending transversely to the direction of movement of said follower element, an eccentric device pressing against said track, a shaft rotating through 180° upon each dual lift of said ram and a radial guide formed on said shaft, said eccentric device being adjustably mounted in said radial guide.

7. The saw sharpening machine of claim 6 characterized in that said eccentric device has a groove extending transversely with respect to said radial guide and a setting bolt guided in said shaft has an end portion in said groove.

8. The saw sharpening machine of claim 2 wherein said track for the follower element is formed on a rocking arm, said first lifting drive has a cam disk, and a means hold said rocking arm against said cam disk.

9. The saw sharpening machine of claim 2 wherein the follower element is continuously held in engagement with the track by a spring.

10. A saw sharpening machine for sharpening teeth of different tooth-tip height comprising a ram adapted to carry a grinding tool or a saw blade, means guiding said ram for reciprocation in the direction of tooth height, a slide movable transversely with respect to the direction of movement of said ram, a first lifting drive acting upon said ram through said slide to impart a reciprocating movement to said ram, an additional lifting drive connected to said first lifting drive by a transmission having a ratio of 1 to 2, said additional lifting drive imparting to said slide reciprocating movements of adjustable length transversely to the direction of movement of said ram for periodically changing the space occupied by said slide between said ram and said first lifting drive, a follower element reciprocal with said slide transversely to the direction of movement of said ram, means adjusting said follower element with respect to said slide transversely to the direction of movement of said ram, said first lifting drive having a track receiving said follower element and defining an angle with the direction of movement of said slide which changes periodically in response to said reciprocating movement of the slide, an additional track formed on the slide transversely of the direction of adjustment of said follower element, a driving element reciprocated by said second lifting drive pressed against said track, said follower element being connected to said slide by an intermediate member which is adjustable independently with respect to the follower element on one hand and with respect to the slide on the other hand, spring means acting on said intermediate member counteracting the movement of said additional driving element, and an abutment reciprocating with said intermediate member urged by said spring means against an abutment provided by said ram in the dead center position of the additional driving element.

11. The saw sharpening machine of claim 10 including a screw spindle threaded into the follower element, and the intermediate member together with the abutment thereon being disposed and fixed in axial relation with the spindle, and said slide being arranged to be movable in an axial direction along said spindle with the intermediate member threaded to the slide and rotatable with respect thereto.

* * * * *